W. TASH.

Brake.

No. 63,765.

Patented Apr. 9, 1867

Witnesses.

Inventor.

United States Patent Office.

WILEY TASH, OF BERLIN, ILLINOIS.

Letters Patent No. 63,765, dated April 9, 1867.

---

IMPROVEMENT IN WAGON-BRAKE.

---

The Schedule referred to in these Letters Patent and making part of the same.

---

TO ALL WHOM IT MAY CONCERN:

Be it known that I, WILEY TASH, of Berlin, in the county of Sangamon, and State of Illinois, have invented a new and useful Improvement in a Wagon-Brake; and I do hereby declare that the following is a full, clear, and exact description thereof, which will enable others skilled in the art to make and use the same, reference being had to the accompanying drawings, forming part of this specification, in which—

Similar letters of reference indicate like parts.

Figure 1:
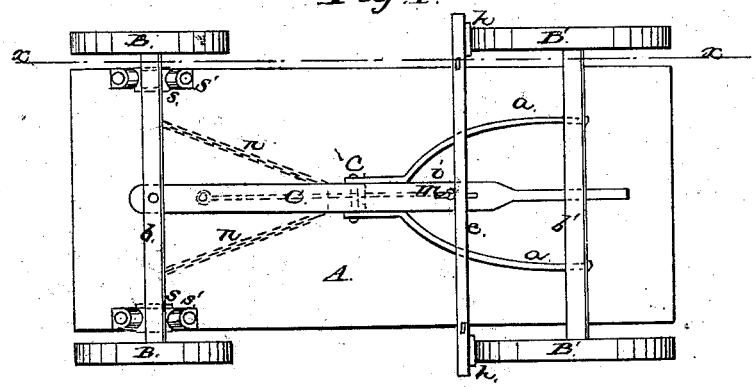
Figure 1 is a bottom view of a wagon with my improved brake attached.
Figure 2:
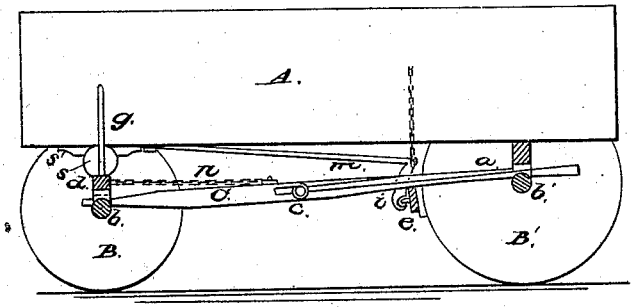
Figure 2 is a side view in section, taken in the line $x\ x$, fig. 1.

This invention relates to an improvement in a wagon-brake to render it self-operative, and consists in connecting the front axle and bolster with a sliding reach in such manner that in descending a hill the brakes or rubbers will be pressed against the hind wheels, and lock or retard their movement just in proportion to the steepness of the descent and the necessity for preventing the wagon from running upon the team.

The wagon body A may be of any ordinary construction, mounted on front wheels, B, and hind wheels, B'. The rear hounds $a\ a$ are made fast to the hind axle $b'$, and are connected with the reach C by a bolt, $c$, running through a longitudinal slot in the reach. The reach C is connected at the fore end with the front axle $b$ and bolster $d$ in the usual way, with a pivot bolt, and the hind end of the reach passes loosely through a hole in the rear axle $b'$. On the under side of the reach C a brake-bar, $e$, is attached to the lower end of a short lever, $i$, which passes up through a slot in the reach and is pivoted to it, and is connected at the upper end with a rod, $m$, running lengthwise with and fastened to the under side of the wagon A. On the end of the brake-bar are rubbers or shoes $h\ h$, as usual. The front bolster $d$ is connected with the reach by chains, $n\ n$, on each side, allowing it a little lateral play when the bolster moves backward or forward, which it does by means of grooved metal rollers, $s\ s$, placed on the ends in connection with the guide-rods $g\ g$, which run up by the sides of the wagon. These rollers $s\ s$ set upon guide-bars $s'\ s'$, fastened to the under side of the wagon frame, and sustain the weight of the front part. Now, it is manifest that when the wagon descends a hill the weight of the wagon body will be thrown forward upon the rollers $s\ s$, and that they will run back upon the guide-bars $s'\ s'$, and carry the front bolster $d$ and the front axle $b$ back together with them, thus moving the reach back also and sliding its rear end through the rear axle $b'$, by which movement the short lever $i$ is drawn forward at its upper end by the rod $m$, while its lower end operates upon the brake-bar $e$, and puts on the brakes $h\ h$ against the hind wheels B' B', and stops their movement, according to the weight of the load and the inclination of the hill while descending, but reverses and releases the brakes at the bottom of the hill.

Having thus described my invention, I claim as new, and desire to secure by Letters Patent—

The rollers $s\ s$ upon the guide-rods $g\ g$ of the bolster $d$, in combination with the guide-bars $s'\ s'$, box A, substantially as herein shown and described.

WILEY TASH.

Witnesses:
R. RUSTEMEIER,
JOHN W. WEGER.